(No Model.)
E. E. RIES.
PROCESS OF ELECTRIC RIVETING.
No. 404,306. Patented May 28, 1889.
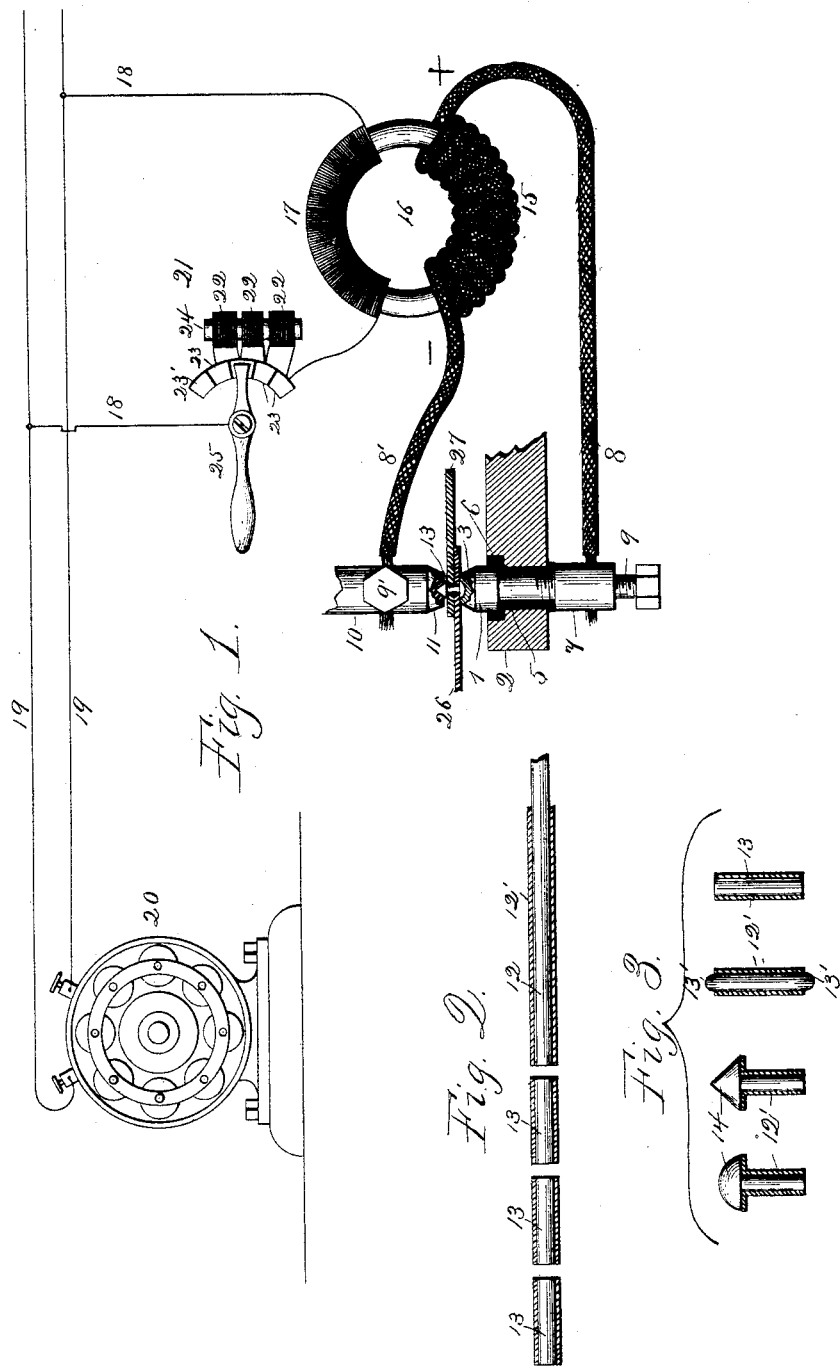
WITNESSES:
Percy C. Bowen
F. J. Chapman
INVENTOR,
Elias E. Ries,
By Joseph Lyons
Attorney

UNITED STATES PATENT OFFICE.

ELIAS E. RIES, OF BALTIMORE, MARYLAND.

PROCESS OF ELECTRIC RIVETING.

SPECIFICATION forming part of Letters Patent No. 404,306, dated May 28, 1889.

Application filed March 5, 1889. Serial No. 301,913. (No model.)

*To all whom it may concern:*

Be it known that I, ELIAS E. RIES, a citizen of the United States, and a resident of Baltimore, in the State of Maryland, have invented certain new and useful Improvements in Processes of Electric Riveting, of which the following is a specification.

My invention has reference to the art of riveting by the aid of electricity in the manner set forth in my application, Serial No. 285,555, filed September 15, 1888, and described and claimed in my application, Serial No. 293,069, filed December 10, 1888; and the object of the present invention is to confine the current in its passage between the riveting-tools, forming the terminals of an electric circuit, to the rivet and prevent it from dividing and passing through and heating the articles to be riveted adjacent to the rivet.

In riveting together two metal articles—such, for instance, as boiler or other plates—by the process set forth in my aforesaid applications, I place a metallic rivet in matched rivet-holes formed in the plates, and then bring the riveting-tools, forming the terminals of the electric circuit, into contact with the ends of the rivet and then allow the current to pass. The rivet in this instance is in electric contact with the plates through which it extends, and therefore the current in its passage between the terminals divides when it reaches the plates, except at the projecting rivet ends immediately in contact with the terminals, and the greater part passes through the plates. Consequently the portion of the rivet-shank within the holes in the plates receives but a small portion of the current, and is not raised to the degree of incandescence and plasticity which is imparted to the projecting ends directly in contact with the terminals, and which receive the entire current; hence when the softened end or ends of the rivet are upset to form rivet-heads, in the manner set forth in my aforesaid applications, the rivet-shank within the holes is not affected by the pressure or force exerted to upset the ends. Thus while the heads of the rivet are forced into close contact with the plates the shank is not upset to completely fill the holes in the plates, and the riveted joint is more or less imperfect.

By my improved process I confine the current passing between the riveting-tools, forming the terminals of the circuit, to the rivet, so that the rivet-shank within the holes, as well as the projecting ends, is raised to the requisite degree of incandescence and plasticity to insure the upsetting of the shank when the said tools are applied to form the head or heads on the rivet, so that the rivet-holes are completely filled by the said shank.

In practicing my improved process I first coat the rivet or rivet-blank in any desired manner at all points where it will come in contact with the plates or other articles to be riveted, when inserted in the holes therein, with suitable insulating material, such as an oxide, mineral paint, soluble glass, or the like, (or the rivet-holes and adjacent parts of the plate may be coated instead of the rivet,) and then insert the rivet in the holes in the plates. I then bring the terminals of the circuit in contact with the bare ends of the rivet and allow the current to pass. The insulation prevents the current from dividing and passing into the plates and confines it to the rivet, which is therefore heated uniformly and rendered plastic throughout its length, and when the heading operation is performed in the manner set forth in my aforesaid applications both the shank and the end or ends of the rivet are upset, thus forcing the rivet at all points into close contact with the plates and insuring a firm joint.

This process may be practiced by means of a great variety of apparatus, and while I have shown one apparatus which is quite effective for the purposes of the invention it will be evident to those skilled in the art that other apparatus entirely different in form and construction may be employed. I am therefore not limited to any particular means in the practice of my invention, which is in the nature of an electro-mechanical process pure and simple.

In the accompanying drawings, forming part of this specification, I have illustrated in Figure 1 a form of apparatus by means of which the heading of the rivet may be effected, with the electrical connections shown mainly in diagram, and in Figs. 2 and 3 a rivet-bar and several forms of rivets respectively adapted for use with my improved process.

Like numerals of reference indicate corresponding parts throughout the drawings.

Referring now more particularly to Fig. 1, there is shown an anvil, 1, which in this case is supported upon a heavy plate or casting, 2, but which may be in one piece with the latter. As here shown, the anvil consists of a cylindrical main body, 1, the upper end of which is shaped conical at 3, and has formed in its upper face a cavity having the form of the head of the rivet to be used. The anvil thus practically constitutes a die, in the form-cavity of which a rivet is placed with its head, with the shank 13 projecting upwardly, as is the common practice in riveting-machines. Below the main body of the anvil the latter is reduced to a pin, 5, which passes through a hole in the supporting-plate 2, and this plate is recessed on its upper face, as at 6, for the reception of a portion of the main body of the anvil.

As shown in Fig. 1, the anvil 1, with its pin-extension 5, is insulated from the supporting-plate 2, and a binding-post, 7, which is screwed onto the end of pin 5 where the same projects through the supporting-plate 2, serves as a clamp-nut for the anvil and receives an electrical conductor, 8, clamped in the binding-post by a binding-screw, 9.

The construction so far described is by no means essential, since the same may be replaced by any ordinary anvil of any desired size so long as the same has formed in its upper face one or more cavities for receiving the heads of rivets; but if such ordinary anvil be used it will be understood that the same must be insulated—as, for instance, by placing it upon a block of wood, like any other stationary anvil—and the electrical conductor 8 will then be connected with the same in any suitable manner.

In connection with the anvil is used a heading-die, 10, which in Fig. 1 is shown as a cylindrical body, the lower end, 11, of which is cone-shaped, and in the under surface of which is formed a cavity corresponding to the shape of the head to be produced upon the free end of the shank of the rivet. A binding-screw, 9', is used for clamping an electric conductor, 8', to the heading-die. This heading-die may be a hand-tool simply, which is grasped by one hand and placed with its die-cavity upon the projecting free end of the rivet-shank, while with the other hand the upper end of the heading-die is struck a number of blows with a hammer, whereby the riveting is effected. The electrical conductors 8 8' lead to the positive (+) and negative (−) poles, respectively, of a suitable electrical generator which furnishes a current of great quantity and very low tension. It will now be understood that the current coming from the positive pole of the generator will pass by conductor 8 through the anvil and rivet, and then through the heading-die, and by conductor 8' back to the negative pole of the generator. By the passage of the current through the rivet the latter is heated, according to the quantity of current employed, to any desired degree of incandescence, and this heating is continued so long as the heading-die remains in contact with the rivet, so that the latter will be maintained in a soft plastic condition until the riveting process is completed and the heading-die removed. The conductors 8 8' (more especially the latter) are made flexible, so that the heading-die may be handled with the same ease as an ordinary hand-tool, a chisel, or the like.

It is evident that the anvil 1 and the heading-tool 10 may be parts of an organized riveting-machine, and that the heading-tool may be brought into contact with the free end of the shank of the rivet and forced down upon it by any suitable mechanism, as shown in the electrical riveting-machines described in my aforesaid applications.

The rivet used in my process must have its two ends clean of rust and other insulating impurities, so that there may be good electrical contact between these ends and the anvil and heading-die, respectively, while the shank of the rivet and the under face of the head of the same should be covered with a thin layer of insulating material. This is shown in Figs. 2 and 3. Fig. 2 shows a rivet-bar, 12, covered with a thin layer of insulating material, 12', such as soluble glass or mineral paint; or these bars may have a thin layer of oxide produced upon their surfaces by any of the well-known artificial methods. When it is intended to use this bar in my riveting process, the same is divided into rivets 13 13 13, of equal length, by means of a cutting-tool, thereby producing clean metallic surfaces at the ends of these rivets, which are then used without a head being formed before insertion into the rivet-hole, as is sometimes done in the ordinary process of riveting. The rivet thus produced, which, as shown at 13 in Fig. 3, is a simple cylindrical bolt, may be used with great advantage; but sometimes, and in order to secure better electrical contact with the ends thereof, these ends may be rounded off and cleaned, as shown at 13' 13' in Fig. 3.

Where rivets of the ordinary shape with heads already formed at one of their ends are used, as shown at 14 in Fig. 3, these heads and the free ends of the shanks must present clean metallic surfaces, while the shanks themselves and the under surface of the heads are covered with insulating material, 12', such as hereinbefore described.

Instead of coating the rivets with insulating material, I may with advantage apply it to the interior of the rivet-holes and immediately around the same where the under side of the head of the rivet makes contact with one of the plates, and in such case a coat of mineral paint, which dries very rapidly, will be the most convenient means of insulation.

I prefer to coat the plates, as described, rather than the rivets, when the current is to be maintained throughout the heading operation, since the plates are not subjected to a sufficiently high degree of heat to destroy the insulating properties of the coating.

The purpose of insulating the rivets from the plates in connection with which they are to be used is, as hereinbefore stated, to confine the electric current to said rivets—that is, to prevent as much as possible the current from passing through the plates—so that the rivet alone will be heated, while the plates or other parts of the work which are being riveted together will remain comparatively cold, and in addition to the advantages following therefrom, as hereinbefore set forth, the plates will not be disfigured, stretched, or otherwise changed by the riveting process.

Any suitable source of electric current may be used for heating the rivets; but by preference I use the alternating currents of low tension and great quantity furnished by the thick-wire secondary coil 15 of a transformer, 16, the fine-wire primary coil 17 of which is charged by alternating currents of high tension and small quantity by the circuit 18 18, derived from a main circuit, 19 19, which in turn is charged by an alternating-current dynamo, 20. In the derived circuit 18 18 is included a reaction rheostat or current-regulator, 21. This current-regulator consists of a series of resistance-coils, 22 22 22, the terminals of which are connected with the switch contact-plates 23, and the soft-iron core 24 is placed within the coils. The switch-lever 25 can be turned by hand to make contact with any one of the contact-plates, whereby the current fed to the primary coil of the transformer can be regulated or turned on and off, as will be readily understood by those skilled in the art, and since the current generated by the secondary coil is directly dependent upon the current fed to the primary coil, it will be seen that the operator can regulate the heating of the rivet to a nicety.

The whole process will now be easily understood. Assuming the heading-die 10 to be a hand-tool, as above described, the operator proceeds as follows: A rivet of the description shown in Fig. 3—that is to say, with its shank and with the under surface of its head (if there is a head) insulated—is then placed with said head or with the head end upon the anvil in the cavity provided for this purpose, and the plates 26 27, which are to be joined by the rivet, are placed with the holes provided for this purpose over the shank of the rivet and one above the other. The operator then takes hold of the heading-die with his left hand and places it with its die-cavity over and in contact with the free end of the shank of the rivet, while with his right hand he turns the switch-lever 25 from the idle contact-plate 23' onto the contact-plates 23, slowly moving said lever from one of these contact-plates to the other until the rivet has attained the required degree of incandescence. The switch-lever is then left in the adjusted position, and the operator now deals a series of heavy blows to the upper end of the heading-die with a hammer, during which operation the heading-die itself should be turned slowly about its axis to and fro. When the heading of the rivet is nearly completed, it will be found advisable to turn the current off gradually, so that the last blow of the hammer will be made when the rivet has lost all incandescence. However, this practice may be changed according to the material of the rivet and according to the nature of the joint which it is intended to produce between the two plates 26 27. Thus it will not be necessary in some cases to maintain the heating-current during the whole process of heading the rivet, for it is quite practicable to bring the rivet to the desired degree of incandescence and then turn the current off and begin and complete the heading or upsetting of the rivet by an ordinary hammer and with or without the use of a heading-die in the usual manner.

It will be evident from the foregoing description that a current passing from one terminal to the other—that is, from the anvil to the heading-tool—will pass through the rivet and be confined thereto in its passage. The rivet, therefore, will be heated to incandescence, while the plates, receiving practically no current, will not be heated to any considerable extent, and when the heading operation is performed the rivet will be upset throughout its length and completely fill the holes in the plates.

For the successful practice of my improved process it is not at all necessary that the anvil should be stationary, as was hereinbefore assumed, for that anvil may be a rather heavy block of metal, (preferably steel,) which is held by an assistant against the head of the rivet, as is now commonly done in the manufacture of boilers or in outdoor work—as on buildings and bridges—and, owing to the very low tension of the currents employed for heating the rivet, such movable anvil need not be insulated with particular care. In fact, it is quite admissible to dispense with all insulation, for there is no danger of an electric shock from currents of such low tension as must be used in this process.

Having now fully described my invention, I claim and desire to secure by Letters Patent—

1. The method or process of riveting, which consists in first interposing insulating material between the rivet and the articles to be riveted, then inserting the rivet into the rivet hole or holes, then heating the rivet by the passage through the same of an electric current of comparatively great quantity and low tension, and then heading the rivet, substantially as described.

2. The method or process of riveting, which consists in interposing insulating material between the rivet and articles to be riveted, then heating the rivet to the required degree of incandescence by the passage through the same of an electric current of suitable quantity and tension, then heading the rivet and maintaining the same in the desired state of incandescence by suitably regulating the current during the heading operation, substantially as described.

3. The method or process of riveting, which consists in first interposing insulating material between the rivet and articles to be riveted, then inserting the rivet into the rivet hole or holes, then passing an electric current of comparatively great quantity and low tension through the rivet until the latter is heated to the desired degree of incandescence, then heading the rivet and at the same time maintaining the incandescence of the same by the continued flow of current, and finally gradually reducing and cutting off the current while the heading is completed, substantially as described.

4. The method or process of riveting metal structures together, which consists in first inserting a metal rivet having an insulated shank and bare conducting ends into the rivet-hole, then connecting the bare ends of the rivet with the terminals of an electric circuit, then charging said circuit with an electric current or currents of proper heating effect until the rivet is heated to the desired degree of incandescence, and then heading the rivet, substantially as described.

5. The method or process of riveting metal structures together, which consists in first inserting a metal rivet having an insulated shank and bare conducting ends into the rivet-hole, then connecting the bare ends of the rivet with the terminals of an electric circuit, then charging said circuit with an electric current or electric currents until the rivet is heated to the desired degree of incandescence, then heading the rivet while the heating-current is maintained, but gradually diminished, and finally breaking the circuit, substantially as described.

6. The method or process of riveting metal structures together, which consists in first interposing insulating material between the rivet and the articles to be riveted, then making electrical contact between the ends of the rivet and an anvil and a heading-die, respectively, which constitute the terminals of an electric circuit, then charging said circuit with an electric current or currents until the rivet is heated to the desired degree of incandescence, and then forcing the heading-die upon the rivet until the heading operation is completed, substantially as described.

7. The method or process of riveting, which consists in interposing between the rivet and the articles to be riveted a coating of insulating material, then passing an electric current of the requisite volume through said rivet to raise it to the required temperature, and then heading or upsetting the rivet, substantially as described.

In testimony whereof I have signed my name to this specification in the presence of two subscribing witnesses.

ELIAS E. RIES.

Witnesses:
E. H. PILSBURY,
L. A. WRAY.